(12) United States Patent
Voelker

(10) Patent No.: US 7,357,539 B2
(45) Date of Patent: *Apr. 15, 2008

(54) PROPORTIONAL BRAKE LIGHT DISPLAY SYSTEM

(76) Inventor: Dean Voelker, 190 1/2 Main St., Reedsburg, WI (US) 53959

( * ) Notice: Subject to any disclaimer, the term of this patent is extended or adjusted under 35 U.S.C. 154(b) by 249 days.

This patent is subject to a terminal disclaimer.

(21) Appl. No.: 11/203,084

(22) Filed: Aug. 12, 2005

(65) Prior Publication Data

US 2006/0181146 A1  Aug. 17, 2006

Related U.S. Application Data

(63) Continuation of application No. 10/456,044, filed on Jun. 9, 2003, now Pat. No. 6,960,008.

(51) Int. Cl.
*F21V 23/04* (2006.01)

(52) U.S. Cl. ........................ 362/394; 362/541

(58) Field of Classification Search ............... 362/541, 362/394; 250/227.14, 227.1
See application file for complete search history.

(56) References Cited

U.S. PATENT DOCUMENTS

| | | | |
|---|---|---|---|
| 4,223,217 A | 9/1980 | Bongard et al. | |
| 4,904,857 A | 2/1990 | Ando et al. | |
| 4,931,794 A | 6/1990 | Haag et al. | |
| 5,818,037 A | 10/1998 | Redford et al. | |
| 5,917,180 A * | 6/1999 | Reimer et al. | 250/227.14 |
| 6,259,364 B1 | 7/2001 | Sowers et al. | |
| 6,607,212 B1 * | 8/2003 | Reimer et al. | 280/735 |

* cited by examiner

*Primary Examiner*—Hargobind S. Sawhney
(74) *Attorney, Agent, or Firm*—Morland C. Fischer

(57) ABSTRACT

A proportional brake light system having an LED display carried on a motor vehicle and capable of instantaneously warning motorists following from behind whether and how quickly the vehicle is likely to stop in response to an operator generated foot pressure being applied to the brake pedal shoe. The brake pedal shoe of the vehicle has a hollow interior, and an optical signal is transmitted along an optical transmission path extending therethrough. As the pressure applied by the operator to the brake pedal shoe is increased, more of the optical signal being transmitted along the optical transmission path is interrupted. A multi-stage comparator is responsive to an interruption of the optical signal so as to cause a corresponding number of LEDs from the display to be illuminated. The LEDs are arranged in a pair of linear arrays that are aligned in oppositely extending illumination paths, such that an identical number of LEDs from each array is simultaneously illuminated to create a highly visible bar graph display.

11 Claims, 4 Drawing Sheets

PROPORTIONAL BRAKE LIGHT DISPLAY SYSTEM

This application is a continuation of application Ser. No. 10/456,044 filed Jun. 9, 2003 now U.S. Pat. No. 6,960,008.

BACKGROUND OF THE INVENTION

1. Field of the Invention

This invention relates to a proportional brake light display system that is carried by a motor vehicle to provide a highly visible warning signal to indicate whether and how quickly the vehicle is likely to stop in response to foot pressure being applied by the operator to the brake pedal shoe of the vehicle. In this way, motorists following from behind will be alerted to a rapid deceleration of the vehicle so as to have additional reaction time, whereby appropriate action might be taken to better avoid a rear end collision.

2. Background Art

All motor vehicles on the road today have some form of visible brake lights that are illuminated in response to the operator pressing his foot against the brake pedal of the vehicle. Such brake lights form a digital display to alert motorists following from behind whether the lead vehicle is decelerating. That is to say, the digital brake light display is either turned entirely off when no foot pressure is applied to the brake pedal or turned entirely on when at least some foot pressure is otherwise being applied to the brake pedal.

In this regard, the conventional brake lights of a motor vehicle provide no indication as to precisely how much foot pressure is applied to the brake pedal and how rapidly the vehicle is likely to stop. Consequently, a motorist following from behind will be unable to ascertain whether the lead vehicle is making a sudden stop or merely undergoing a gradual slowing. As a result of seeing the illumination of the brake lights of the lead vehicle, the operator of the vehicle following from behind may unnecessarily apply too much pressure to his own brake pedal or fail to apply sufficient brake pressure in what may turn out to be an emergency situation. In either case, the inability of the operator of the trailing vehicle to be able to quickly recognize the extent to which the lead vehicle is decelerating may lead to an accident.

Brake light warning systems are known by which lights from a display are illuminated depending upon the pressure that is applied by the operator to his brake pedal. However, some of these warning systems are characterized by many components and a correspondingly high manufacturing cost. Other warning systems are relatively complex and/or may not provide an instantaneous and accurate indication as to the deceleration of the vehicle in which it is used. Examples of known brake light warning systems such as those described above are available by referring to one or more of the following United State patents:

| | | |
|---|---|---|
| 5,150,098 | Rakow | 22 Sep. 1992 |
| 5,717,377 | Gao | 10 Feb. 1998 |
| 6,002,329 | Marks | 14 Dec. 1999 |
| 6,100,799 | Fenk | 8 Aug. 2000 |
| 6,268,792 | Newton | 31 Jul. 2001 |
| 6,317,038 | Leleve et al | 13 Nov. 2001 |
| 6,333,688 | Brown et al | 25 Dec. 2001 |

SUMMARY OF THE INVENTION

A proportional brake light display system is disclosed to be carried by a motor vehicle to provide a visible warning signal by which to indicate whether and how quickly a vehicle is likely to stop in response to foot pressure being applied by the operator to the brake pedal, whereby motorists following from behind will be alerted to a rapid deceleration of the vehicle so that additional reaction time will be made available during which to take appropriate action to avoid a rear end collision as well as subsequent chain reaction collisions. A unique optical pressure sensor is located within a hollow cavity formed in the brake pedal shoe of the vehicle. The brake pedal shoe includes a flexible top surface that is adapted to be depressed under pressure. The optical pressure sensor located at the interior of the hollow brake pedal shoe includes a resilient optical transmission guide, an optical emitter located at one end of the optical transmission guide, and an optical detector located at the opposite end, such that an optical transmission path is established via the transmission guide between the emitter and the detector.

The optical detector is adapted to generate a variable voltage signal, the magnitude of which is inversely proportional to the foot pressure applied by the operator to the brake pedal shoe. More particularly, a pressure applied to the brake pedal shoe causes the flexible top surface thereof to be depressed. The depression of the flexible pad surface causes a corresponding compression of the resilient optical transmission guide and, therefore, an interruption of at least some of the optical signal being transmitted along the optical transmission path therethrough. The optical detector supplies the aforementioned variable voltage signal to a display to cause a number of lights (LEDs) of the display to be illuminated in proportion to the pressure that has been applied to the brake pedal shoe and the resulting interruption of the optical signal along the optical transmission path.

The display is controlled by an IC chip which, in the present embodiment, functions as a multi-stage comparator. The LEDs of the display are arranged in first and second linear arrays that extend in opposite directions along first and second illumination paths. The IC comparator is responsive to the magnitude of the variable voltage signal generated by the optical detector of the optical pressure sensor for causing an identical number of LEDs from each of the first and second linear arrays to be simultaneously and sequentially illuminated by means of a plurality of LED drivers. A single LED driver controls the illumination of a single LED from each of the linear arrays, whereby the display achieves the effect of a dynamic visual bar graph that can be easily recognized and immediately interpreted by motorists following from behind.

DETAILED DESCRIPTION

Figure 1:
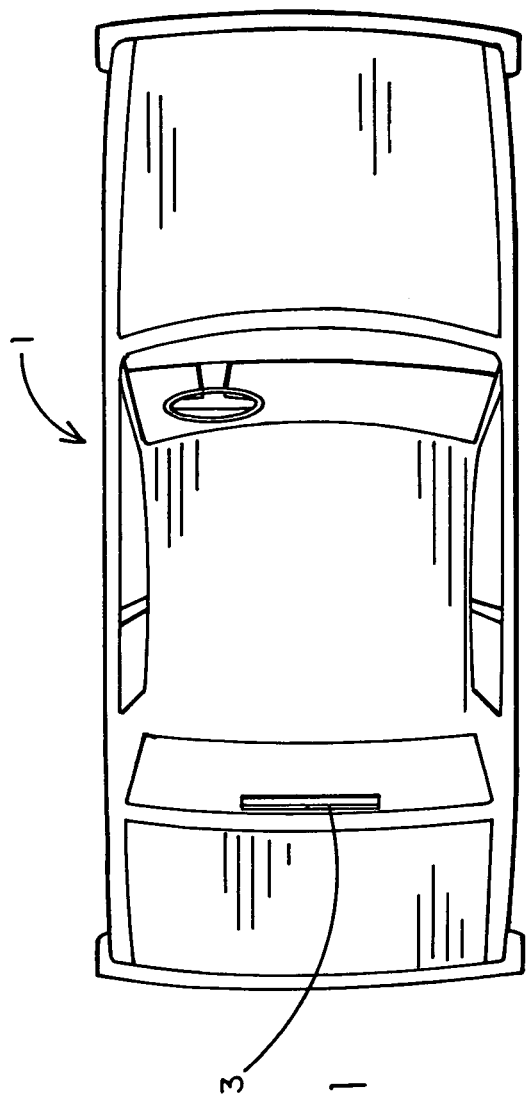
FIG. 1 shows a motor vehicle having attached thereto the proportional brake light system of this invention.

The proportional brake light display system which forms this invention is initially described while referring to FIG. 1 of the drawings where there is shown a motor vehicle 1. Although the motor vehicle 1 illustrated in FIG. 1 is an automobile, the brake light display system herein disclosed may be associated with any type of motor vehicle where it is desirable to provide a visible warning signal that is capable of instantaneously indicating whether and how quickly a vehicle is likely to stop in response to a pressure being applied to the brake pedal shoe of the vehicle by the vehicle operator. By virtue of the foregoing, motorists following from behind will be alerted to a deceleration of the vehicle 1 and to an approximate stopping time in response to the particular pressure that is exerted by the operator on the brake pedal shoe to cause such deceleration. Accordingly, the operator of the vehicle following from behind will be given extra time to react to a rapid deceleration of the vehicle 1 so as to take action that is appropriate under the circumstances to avoid a rear end collision. In this regard, the brake light display system herein disclosed can be used in combination with or in substitution of the conventional brake lights of a motor vehicle.

To this end, a brake light display 3 is mounted at the rear of the motor vehicle 1 so as to be clearly visible to motorists following from behind. By way of example, the brake light display 3 is shown in FIG. 1 located below the rear window of vehicle 1. However, it is to be understood that the precise location of the brake light display 3 is not to be regarded as a limitation of this invention, such that display 3 may also be conveniently mounted above the rear window or atop the trunk of the vehicle or incorporated within the conventional tail lights of the vehicle, to name but a few different suitable locations.

Figure 2:
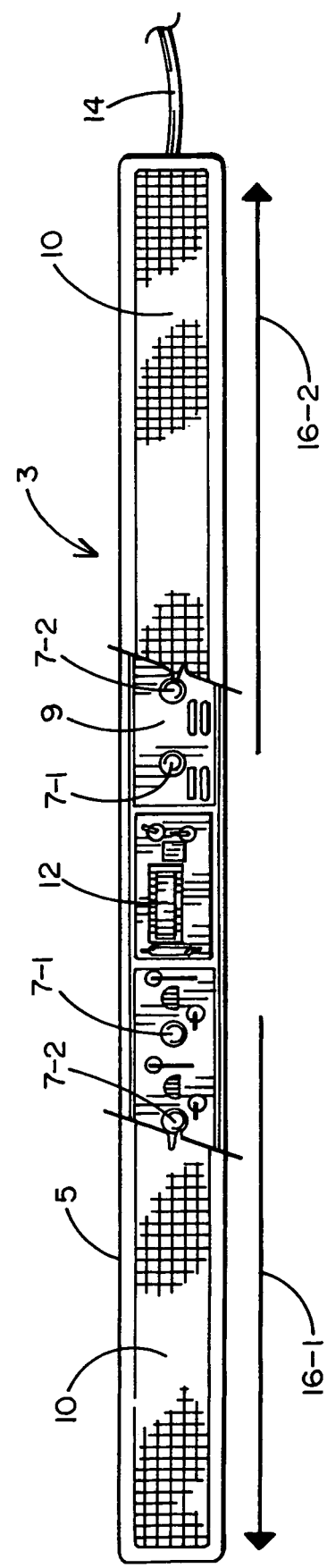
FIG. 2 shows an LED display from the proportional brake light display system of FIG. 1.

As is best shown in FIG. 2 of the drawings, the brake light display 3 includes a housing 5 having a rectangular shape and a size that is suitable for the location of the vehicle at which display 3 will be mounted. In the case where the brake light display 3 will be an auxiliary brake light system to be used in addition to the conventional brake lights of the vehicle, an adhesive may be applied to the rear of housing 5 to enable the display 3 to be adhesively attached to the vehicle. However, other attachment means including stands, brackets, and the like, are also contemplated herein.

A series of lights (e.g. LEDs) 7 are mounted in a linear array along a rigid substrate (e.g. a printed circuit board) 9 within the housing 5 of brake light display 3. The lights 7 are surrounded by an optically transparent cover 10 that is seated upon the housing 5. Although a rectangular brake light housing 5 and a linear array of lights 7 are shown in FIG. 2, the housing 5 and the alignment of lights 7 therewithin may have other shapes and configurations, such as round, square, triangular, etc. The display 3 is powered from the battery of the vehicle via a power cable 14.

As will be explained in greater detail hereinafter, the number of lights 7 from display 3 that are illuminated and the particular sequence in which such lights are illuminated are dependent upon the amount of pressure that is applied to the brake pedal shoe by the operator so as to cause the vehicle 1 (of FIG. 1) to decelerate. That is to say, the light pattern that is visible through the cover 10 of display 3 to those following from behind the vehicle 1 is proportional to the braking force to which the vehicle is subjected by means of depressing the brake pedal shoe. More particularly, the greater the pressure applied to the brake pedal shoe, the greater the number of lights to be illuminated at display 3.

In this same regard, by causing the lights 7 to be illuminated sequentially and outwardly along oppositely extending illumination paths which originate from the center of housing 5 (in the directions indicated by reference arrows 16-1 and 16-2), the brake light display 3 of this invention will resemble a bar graph display that can be quickly and easily interpreted by motorists following vehicle 1 from behind.

To achieve the foregoing sequential and proportional illumination of the brake light display 3, the lights 7 thereof are divided into identical left and right linear arrays (as also represented by the reference arrows 16-1 and 16-2), the illumination of which is controlled by a suitable semiconductor integrated circuit chip 12 mounted on substrate 9. As will be explained hereinafter when referring to FIG. 4, the IC chip 12 receives a variable electrical input signal via an electrical cable (designated 46 in FIG. 4) from a unique optical pressure sensor that is located within the brake pedal shoe of the vehicle 1 to which pressure is applied by the operator to slow the vehicle. The electrical input signal received by the IC chip 12 of brake light display 3 varies in proportion to the pressure applied to the brake pedal shoe so as to cause a corresponding number of lights 7-1, 7-2, etc. from each of the left and right arrays thereof to be simultaneously and sequentially illuminated along the oppositely extending illumination paths 16-1 and 16-2.

Turning to FIGS. 3A-3D of the drawings, the integration of the aforementioned optical pressure sensor and brake pedal shoe will now be disclosed. As indicated immediately above, the optical pressure sensor cooperates with the brake pedal shoe to generate an electrical signal to be supplied to the IC chip 12 of the brake light display 3 of FIG. 2 in order to cause an identical number of lights 7-1, 7-2, etc. to be sequentially illuminated from each of the left and right arrays and along oppositely extending illumination paths 16-1 and 16-2 in proportion to the pressure that is applied to the brake pedal shoe by the operator when it is necessary to slow the vehicle.

Figure 3A:
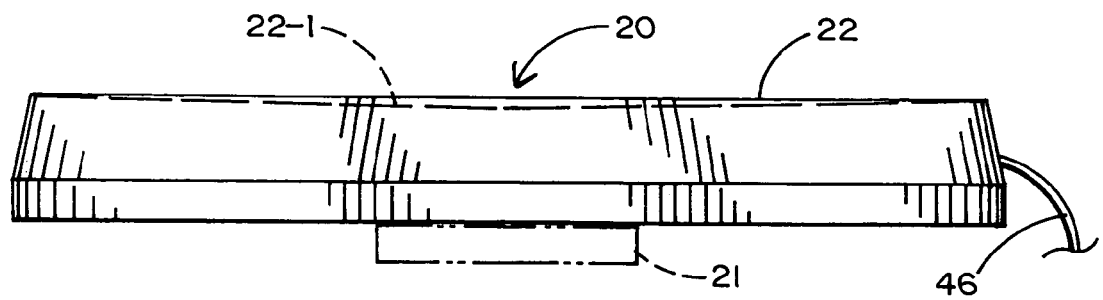
FIG. 3A shows a side view of a brake pedal shoe having a hollow interior within which an optical pressure sensor from the proportional brake light display system is located.

FIG. 3A shows the brake pedal shoe 20 supported within the passenger compartment of the motor vehicle (designated 1 in FIG. 1) by the usual brake pedal arm 21 (shown in phantom lines). The brake pedal shoe 20 is preferably manufactured from rubber and adapted to cause a displacement of the brake pedal arm 21 when a compressive pressure is applied to the top surface 22 of shoe 20 by the foot of the operator to cause a deceleration of the vehicle. The interior of brake pedal shoe 20 is generally hollow such that a compressive pressure applied by the operator's foot will cause the top surface 22 to be depressed inwardly (represented by the phantom line 22-1). The distance traveled by the top surface 22 of brake pedal shoe 20 is dependent upon the pressure that is generated by the operator's foot pushing against the top surface 22 to be transmitted to brake pedal arm 21 for causing the vehicle to decelerate.

Figure 3B:
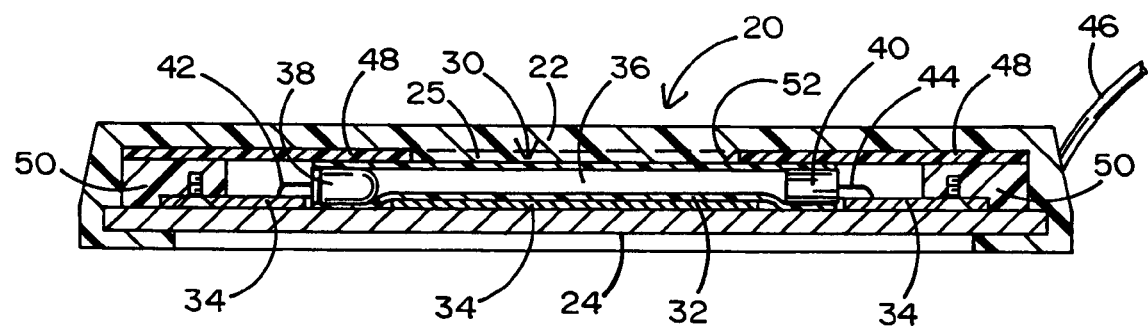
FIG. 3B shows the hollow interior of the brake pedal shoe of FIG. 3A with the optical pressure sensor located therewithin.
Figure 3C:
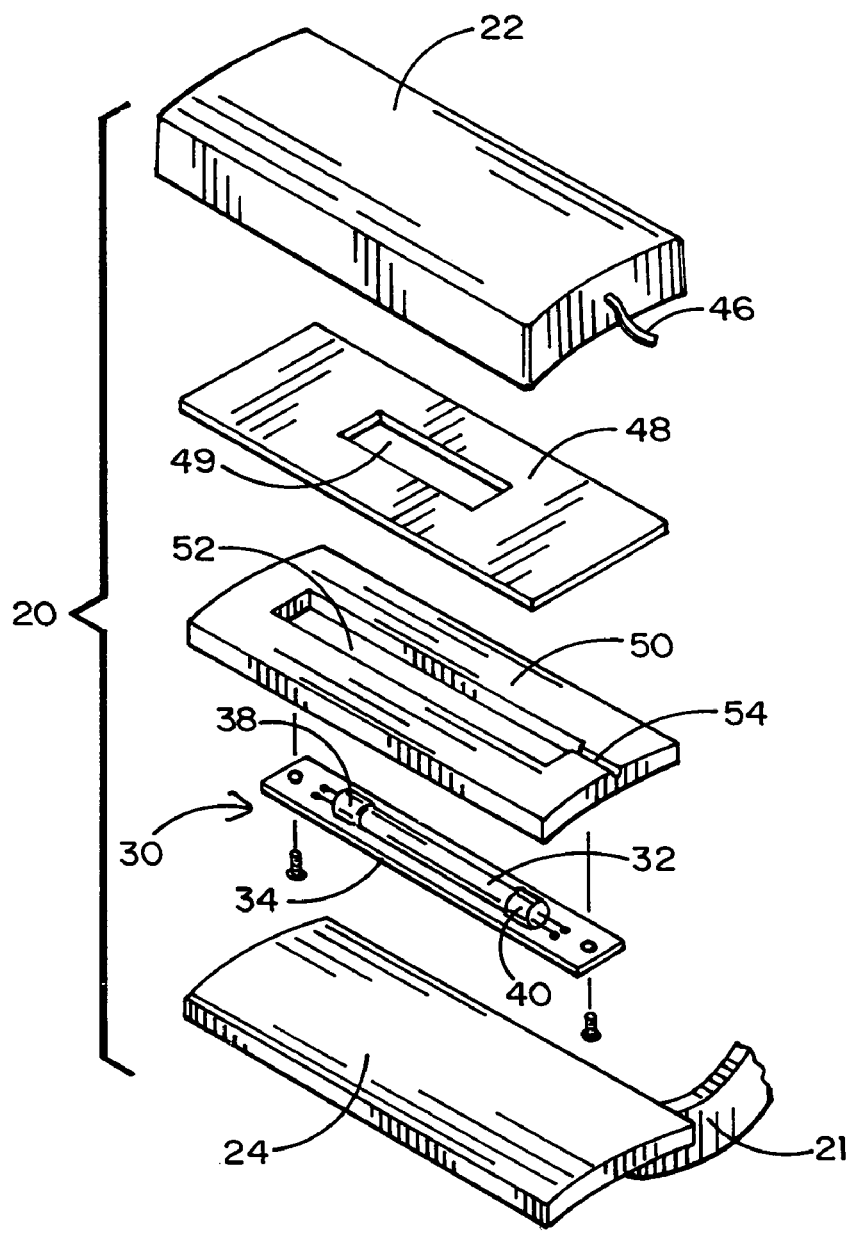
FIG. 3C is an exploded view of the brake pedal shoe of FIG. 3B.

Referring concurrently to FIGS. 3B and 3C, the brake pedal shoe 20 is shown with the flexible top surface 22 mated to the brake pedal 24 and the optical pressure sensor 30 of this invention located at the hollow interior of shoe 20 between top surface 22 and brake pedal 24. The optical pressure sensor 30 includes a tubular, open ended optical guide 32 that is manufactured from a resilient (e.g. closed cell styrene polymer foam) material having a spring characteristic. That is to say, the resilient optical guide 32 of optical sensor 30 is adapted to be compressed under the pressure generated by the operator's foot pressing against the top surface 22 of shoe 20 (best shown in FIG. 3D) and then automatically expand to its original tubular shape when the pressure is removed. The optical guide 32 is seated on a stiffener (e.g. a printed circuit board) 34 so that the pressure generated by the operator's foot and applied to the top surface 22 of brake pedal shoe 20 will be uniformly distributed along the tubular optical guide 32. The printed circuit board stiffener 34 rests upon the brake pedal 24.

The tubular, open ended optical guide 32 of optical pressure sensor 30 is shown with an optical path 36 running longitudinally therethrough. Located within one end of the optical guide 32 so as to communicate with the optical path 36 is an optical source (e.g. an infrared LED emitter) 38. Located within the opposite end of optical guide 32 so as to lie in axial alignment with emitter source 38 is an optical detector (e.g. an infrared sensitive phototransistor) 40 whereby a voltage divider network is established therebetween. Each of the optical emitter 38 and detector 40 has a pair of terminals 42 and 44 that extend downwardly to the printed circuit board stiffener 34 at which to be interconnected with the LED display 3 via cable 46 in the manner shown in FIG. 4.

The optical pressure sensor 30 at the hollow interior of the brake pedal shoe 20 is covered by a resilient pad 48 having a spring characteristic and a window 49 formed therein which lies directly above the optical guide 32. The resilient pad 48 is positioned below the top surface 22 of brake pedal shoe 20 such that a projection 25 which extends downwardly from the underside of the top surface 22 of shoe 20 is received through the window 49 in resilient pad 48 so as to communicate with the optical guide 32 of optical pressure sensor 30 (best shown in FIG. 3B). By way of example, the resilient pad 48 is a closed cell foam pad. Like the tubular optical guide 32 of optical pressure sensor 30, the resilient pad 48 is capable of being compressed under the pressure that is generated by the operator's foot pressing against the top surface 22 of shoe 20 and then automatically expanding back to its original shape when the pressure is removed.

The outer edges of the resilient pad 48 are affixed (e.g., adhesively bonded) to a rectangular, non-compressible limiter 50 that extends around the periphery of the brake pedal 24 so as to surround the optical pressure sensor 30. Limiter 50 includes a central opening 52 that is sized to receive sensor 30 therethrough. By way of example, the limiter 50 is manufactured from hard plastic that is not capable of being easily compressed under pressure. The purpose of limiter 50 is to oppose the pressure that is applied to the resilient pad 48 by the top surface 22 of brake pedal shoe 20 and thereby prevent permanent damage to optical pressure sensor 30, particularly at those times when the pressure being exerted by the operator's foot against the brake pedal shoe 20 is excessive, such as in emergency situations. A short channel 54 is established in the limiter 50 to accommodate cable 46 therewithin.

Thus, it can now be appreciated that the tubular optical guide 32 of optical pressure sensor 30 is sandwiched between the stiff printed circuit board 34 and the projection 25 from the top surface 22 of brake pedal shoe. As will be explained when referring to FIG. 3D, the pressure generated by the operator's foot and applied to the top surface 22 of brake pedal shoe 20 will be transferred to the tubular optical guide 32 of optical pressure sensor 30 by means of the projection 25 received through the window 49 of resilient pad 48. In this manner, the optical pressure sensor 30 of this invention will be more responsive to the pressure applied to shoe 20 during a deceleration of the operator's vehicle.

Figure 3D:
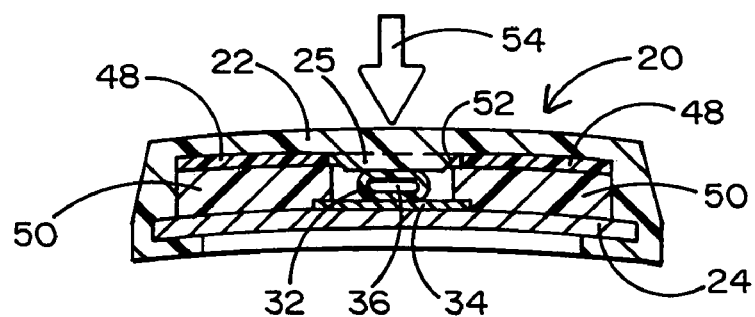
FIG. 3D shows a cross-section of the brake pedal shoe as a compressive pressure is applied thereto.
Figure 4:
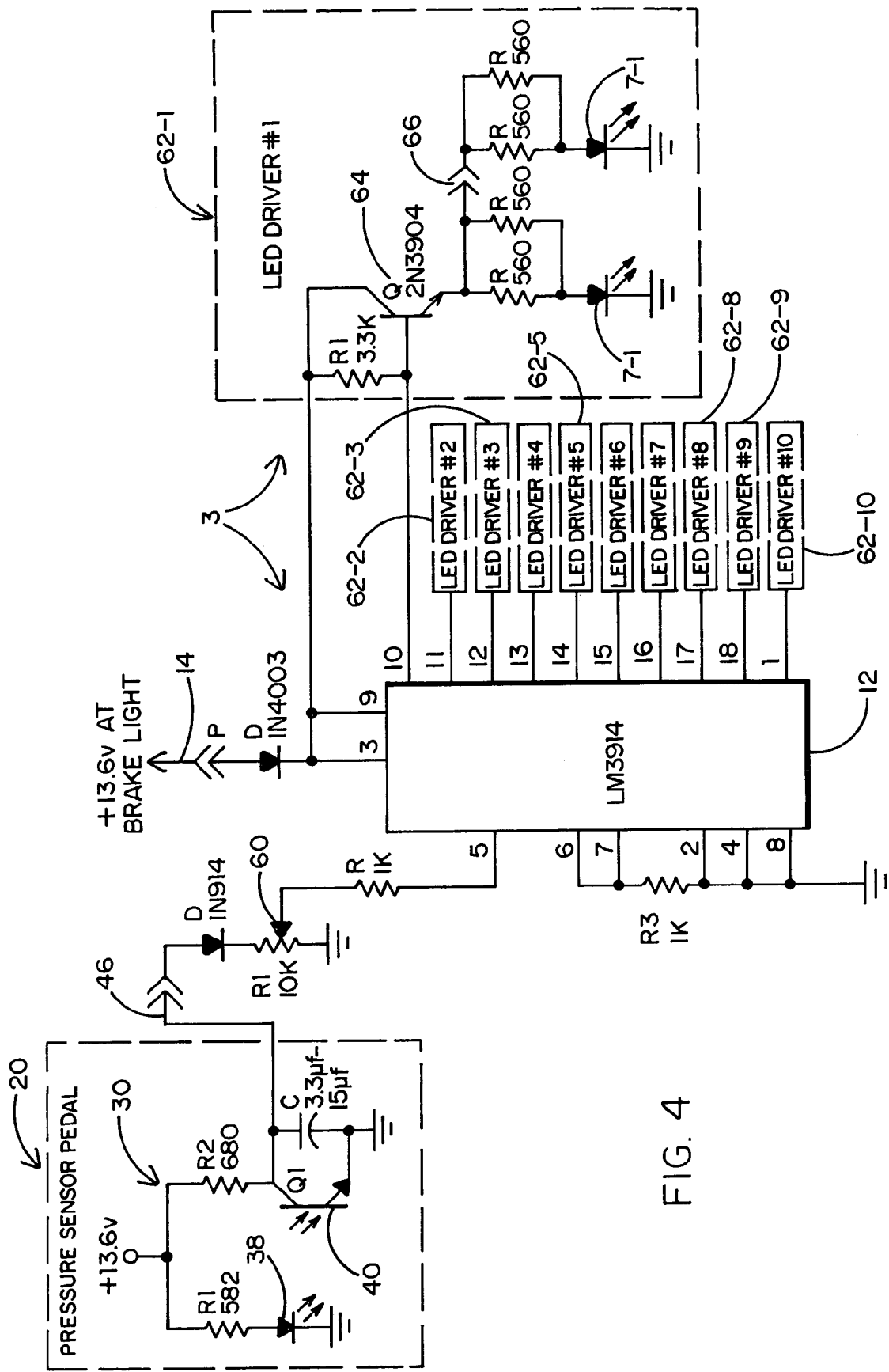
FIG. 4 shows a schematic circuit for the proportional brake light display system.

The cooperation between the brake pedal shoe 20 and optical pressure sensor 30 at the hollow interior of shoe 20 for providing a signal that is indicative of whether and how rapidly the motor vehicle 1 of FIG. 1 is slowing is now described while referring to FIG. 3D of the drawings. During those times when the vehicle is accelerating or moving at a constant velocity, the brake pedal shoe 20 will be at rest. Therefore, no forces are applied to the top surface 22 of brake pedal shoe 20. Accordingly, and as shown in FIG. 3B, the optical path 36 through the tubular optical guide 32 which lies between the optical emitter 38 and the optical detector 40 of optical sensor 30 is completely open and uninterrupted, such that none of the light being transmitted therethrough is either blocked or impeded. The optical detector 40 provides an output voltage signal over the electrical cable 46 which, as will be explained when referring to FIG. 4, is adapted to cause all of the lights (i.e. LEDs) 7 of the brake light display 3 of FIG. 2 to be deenergized, whereby display 3 will be dark.

However, in the event that the vehicle 1 begins to decelerate as a result of the operator using his foot to press against the brake pedal shoe 20, a compressive force (represented by reference arrow 54 in FIG. 3D) will be applied to the flexible top surface 22 of shoe 20. The pressure generated by the operator's foot will cause the top surface 22 of brake pedal shoe 20 to be depressed (to a position indicated by the phantom line 22-1 of FIG. 3A). The depression of the top surface 22 is transmitted to the tubular optical guide 32 of optical sensor 30 by way of the projection 25 at the underside of top surface 22. Depending upon the magnitude of the pushing force 54 generated by the operator's foot against brake pedal shoe 20, the corresponding depression of the top surface 22, and the resulting movement of projection 25 through window 49, the optical path 36 through optical guide 32 will be either partially obstructed or completely blocked.

That is to say, and as was earlier disclosed, the tubular optical guide 32 of optical pressure sensor 30 that is carried at the hollow interior of brake pedal shoe 20 is sandwiched between the printed circuit board stiffener 34 lying against brake pedal 24 and the projection 25 lying below the top surface 22 of brake pedal shoe 20. The pushing force 54 applied to the brake pedal shoe 20 and the corresponding depression of the top surface 22 thereof causes the tubular optical guide 32 to be compressed between the projection 25 and the printed circuit board 34, whereby some or all of the light that is transmitted between the optical sensor 38 and the optical detector 40 will be interrupted. Moreover, the shape of the tubular optical guide 32 will be changed in proportion to the force 54 being applied to shoe 20 and transmitted to optical guide 32 via projection 25.

The optical detector 40 of FIG. 3B provides a varying output voltage signal over cable 46 by which to cause some or all of the lights 7 of the brake light display 3 of FIG. 2 to be energized, whereby the display will now be illuminated. What is even more, the lights 7 of the brake light display 3 will be sequentially illuminated along oppositely extending illumination paths 16-1 and 16-2 (of FIG. 2) to provide a dynamic bar graph to instantaneously and visually alert motorists following behind vehicle 1 so that appropriate action can be taken to avoid a rear end collision following the deceleration of vehicle 1 and the illumination of the lights 7 at the brake light display 3 in the response thereto.

When the operator of the motor vehicle 1 removes his foot from the brake pedal shoe 20, the resiliency and spring memories of the tubular optical guide 32 and the resilient pad 48 will cause the formerly compressed optical guide 32 to regain its original tubular shape and the formerly depressed top surface 22 of brake pedal shoe 20 to return to its original planar configuration. The brake light display 3 will once again go dark until the next time that the operator presses his foot against brake pedal shoe 20 to slow the vehicle 1.

FIG. 4 of the drawings shows a schematic circuit for the proportional brake light display system of this invention. The circuitry includes a force-to-voltage converter section consisting of the optical pressure sensor 30 that is sandwiched between the top surface 22 of brake pedal shoe 20 and the printed circuit board 34. As previously disclosed, the optical pressure sensor 30 includes an infrared LED emitter 38 and an infrared sensitive photo transistor detector 40. As was also disclosed, the output voltage of the detector 40 is dependent upon the operator generated foot pressure that is applied to the brake pedal shoe 20 and to the corresponding amount of light that is transmitted between the emitter 38 and detector 40 via the tubular optical guide 30 (of FIG. 3B). In this regard, it may be appreciated that the greater the operator generated pressure applied to brake pedal shoe 20, the more the tubular optical guide 30 will be compressed, such that the detector 40 will receive less light from emitter 38, whereby the output voltage produced by detector 40 will decrease. In other words, the variable voltage output produced by detector 40 is inversely proportional to the operator generated force that is applied to brake pedal shoe 20.

The circuitry of FIG. 4 also has a logic section including the integrated circuit chip 12 which is used herein as a multi-stage comparator to control the number and sequence of the lights (LEDs) 7 from the brake light display 3 of FIG. 2 that will be illuminated. Connected between the cable 46 over which the variable output voltage of detector 40 is transmitted and an input terminal of the IC comparator 12 is a conventional trim pot 60 which enables the brake light display system to be initialized and calibrated for purposes of setting predetermined threshold levels and adjusting the sensitivity with regard to a depression of brake pedal 20.

Also included in the circuitry of FIG. 4 are the individual LEDs 7 of the brake light display 3 of FIG. 2 as well as the circuitry for driving the LEDs 7. In the example of FIG. 2, the brake light display includes a total of twenty LEDs. As previously described, the LEDs 7 of display 3 are divided into a pair of identical linear arrays, each having ten LEDs 7 oriented along the oppositely extending illumination paths 16-1 and 16-2 of FIG. 2. A single LED 7-1 . . . 7-10 from each of the linear arrays is controlled by the same driver circuit so as to be simultaneously illuminated. Therefore, in the present case, a total of ten identical driver circuits 62-1 . . . 62-10 and a ten stage 1C comparator 12 are interfaced with one another to control the ten pairs of LEDs 7-1 . . . 7-10 of the brake light display 3.

For convenience, only the first driver circuit 62-1 will be described herein by which a pair of the LEDs 7-1 are controlled. The particular LEDs 7-1 to be controlled by driver circuit 62-1 are located closest to and at opposite sides of the IC comparator 12 of brake light display 3 (best shown in FIG. 2). By controlling pairs of the LEDs 7-1 . . . 7-10 by respective driver circuits 62-1 . . . 62-10, the LEDs can be sequentially illuminated along the oppositely extending illumination paths 16-1 and 16-2 of FIG. 2, whereby to provide the brake light display 3 with a dynamic, highly visible bar graph effect that changes with the foot pressure being applied by the operator to the brake pedal shoe 20 in the manner described above.

Each driver circuit (e.g. 62-1) includes an NPN driver transistor 64, the control electrode of which is connected to an output terminal of the IC comparator 12. The driver transistor 64 is coupled to an LED (e.g. 7-1) from each of the linear arrays along illumination paths 16-1 and 16-2 of FIG. 2 at opposite sides of the IC comparator 12 by way of a bridge connector 66.

As was previously disclosed when referring to FIGS. 3A-3D, a variable voltage signal is supplied from the phototransistor detector 40 of optical pressure sensor 30 via cable 46 to an input terminal of the IC comparator 12. More particularly, the magnitude of the input signal received by comparator 12 will diminish in an inverse relationship as the foot pressure applied to the brake pedal 20 increases. Depending upon the initial calibration (by means of trim pot 60), the IC comparator 12 produces output signals by which some, all or none of the ten pairs of LEDs 7-1 . . . 7-10 will be illuminated by their respective driver circuits 62-1 . . . 62-10 in proportion to the foot pressure applied to and the resultant depression of brake pedal shoe 20. In the case where no foot pressure is being applied to the brake pedal shoe 20 and a maximum voltage signal is applied to IC comparator 12 from detector 40, the driver circuits 62-1 . . . 62-10 connected to IC comparator 12 will cause all of the driver transistors 64 to turn off, whereby none of the LEDs 7-1 . . . 7-10 will be illuminated and the brake light display 3 will go dark. As the foot pressure being applied to brake pedal shoe 20 increases and the voltage signal applied to IC comparator 12 from detector 40 diminishes, some or all of the driver transistors 64 of driver circuits 62-1 . . . 62-10 will now be turned on, whereby corresponding pairs of the LEDs 7-1 . . . 7-10 will be energized to illuminated the brake light display 3.

The proportional brake light display 3 herein disclosed can be efficiently manufactured by using only a relatively few number of components in order to provide a fast, clear and sweeping (i.e. bar graph) indication of whether and how soon the vehicle 1 of FIG. 1 is likely to stop so as to alert motorists following from behind whereby to maximize their reaction time to take suitable action. Moreover, the proportional brake light display 3 can also function as a redundant or fail safe system should the usual brake lights of the vehicle 1 fail. What is even more, the optical pressure sensor 30 and display 3 herein disclosed may also be used in other applications where it is necessary to provide a visual indication that is representative of a pushing force applied to a push pad surface.

I claim:

1. A pressure responsive control system comprising:
   a push pad having a pressure responsive surface that is adapted to be depressed when a pushing force is applied to said push pad, said push pad having an optical transmission path along which an optical signal is transmitted;
   a plurality of loads to be selectively operated in response to the magnitude of a pushing force applied to said push pad and a corresponding depression of said pressure responsive surface thereof so as to create an obstruction in the optical transmission path and thereby interrupt at least some of the optical signal which is transmitted along said optical transmission path, the intensity of said optical signal decreasing with an increase in the pushing force applied to the pressure responsive surface of said push pad; and
   load control circuitry connected to said plurality of loads and responsive to an interruption of said optical signal transmitted along said optical transmission path of said push pad created by said obstruction for controlling the operation of individual ones of said plurality of loads in a manner that is directly proportional to the magnitude of said pushing force and inversely proportional to the intensity of said optical signal.

2. The pressure responsive control system recited in claim 1, further comprising an optical signal emitter located at one end of said optical transmission path to transmit said optical signal therealong and an optical signal receiver located at the opposite end of said optical transmission path to receive said optical signal transmitted from said emitter, the depression of the pressure responsive surface of said push pad causing said obstruction to be located between said optical signal emitter and said optical signal receiver so as to interrupt at least some of the optical signal being transmitted along said optical transmission path, the operation of the individual ones of said plurality of loads being selectively controlled depending upon the magnitude of said pushing force applied to said push pad and the corresponding intensity of the optical signal received by said optical signal receiver.

3. The pressure responsive control system recited in claim 2, wherein said plurality of loads are light emitting diodes, individual ones of said light emitting diodes being selectively illuminated depending upon the magnitude of said pushing force applied to said push pad and the corresponding intensity of the optical signal received by said optical signal receiver.

4. The pressure responsive control system recited in claim 3, wherein said plurality of light emitting diodes form an optical display, said optical display providing a visual indication of the magnitude of said pushing force applied to said push pad depending upon the number of said light emitting diodes that are illuminated in response thereto.

5. The pressure responsive control system recited in claim 1, wherein said load control circuitry includes a comparator that is connected to said plurality of loads and responsive to the optical signal transmitted through said optical transmission path, said comparator operating a particular number of said plurality of loads depending upon the intensity of said optical signal.

6. The pressure responsive control system recited in claim 5, wherein said comparator is connected to receive a variable voltage signal that is indicative of the intensity of the optical signal transmitted through said optical transmission path in response to the pushing force applied to said push pad, said comparator adapted to sequentially operate the particular number of said plurality of loads depending upon the intensity of said optical signal and the magnitude of the variable voltage signal that is indicative thereof.

7. The pressure responsive control system recited in claim 1, wherein said optical transmission path is located within said push pad.

8. The pressure responsive control system recited in claim 7, wherein said optical transmission path within said push pad is an optical guide manufactured from a resilient material, the pushing force applied to said push pad causing a compression of said optical guide and an interruption of at least some of the optical signal transmitted therethrough depending upon the magnitude of said pushing force.

9. A pressure responsive control system comprising:
a push pad having a pressure responsive surface that is adapted to be depressed when a pushing force is applied to said push pad, said push pad having an optical transmission path through which an optical signal is transmitted;
a plurality of switchable devices to be selectively switched in response to the magnitude of a pushing force applied to said push pad and a corresponding depression of said pressure responsive surface thereof so as to create an obstruction in the optical transmission path and thereby interrupt at least some of the optical signal which is transmitted through said optical transmission path, the intensity of said optical signal decreasing with an increase in the pushing force applied to the pressure responsive surface of said push pad; and
load control circuitry for generating a variable voltage signal that is indicative of the intensity of the optical signal transmitted through said optical transmission path in response to the pushing force applied to said push pad, said load control circuitry including a multistage comparator for receiving said variable voltage signal and comparing said variable voltage signal against a predetermined reference voltage signal for sequentially switching particular ones of said plurality of switchable devices depending upon the magnitude of said variable voltage signal.

10. A pressure responsive control system comprising:
a push pad having a pressure responsive surface to be depressed when a pushing force is applied to said push pad, said push pad having a hollow interior and an optical transmission path extending through said hollow interior through which an optical signal is transmitted;
a visual display to be illuminated in response to a pushing force being applied to said push pad and a depression of said pressure responsive surface thereof so as to create an obstruction in the optical transmission path and thereby interrupt at least some of the optical signal being transmitted through said optical transmission path, the intensity of said optical signal decreasing with an increase in the pushing force applied to the pressure responsive surface of said push pad; and
control circuitry connected to said visual display and responsive to an interruption of said optical signal being transmitted through said optical transmission path created by said obstruction at the hollow interior of said push pad for causing different portions of said visual display to be illuminated in a manner that is directly proportional to the magnitude of the pushing force and inversely proportional to the intensity of said optical signal.

11. The combination recited in claim 10, further comprising an optical signal source located at one end of said optical transmission path to transmit said optical signal therethrough and an optical signal receiver located at the opposite end of said optical transmission path to receive said optical signal transmitted from said source, the depression of the pressure responsive surface of said push pad causing said obstruction to be located between said optical signal source and said optical signal receiver and the said interruption of at least some of the optical signal being transmitted through said optical transmission path, whereby the different portions of said visual display are illuminated depending upon the magnitude of the pushing force applied to said push pad and the corresponding intensity of the optical signal received by said optical signal receiver.

* * * * *